June 28, 1927.
W. H. PIERCE
FASTENER STUD
Filed July 22, 1925
1,634,234
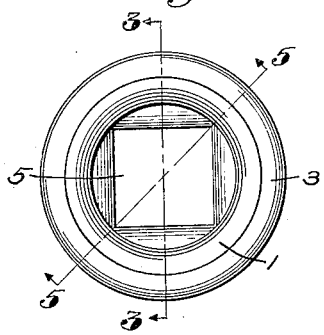
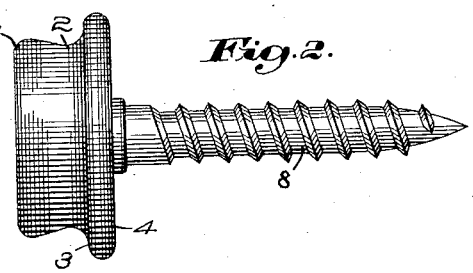
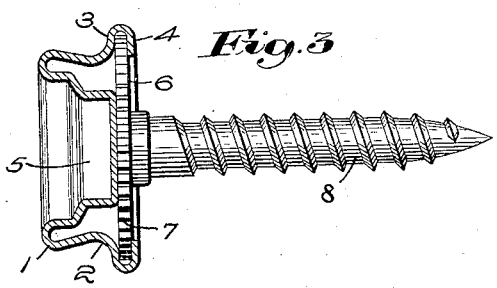
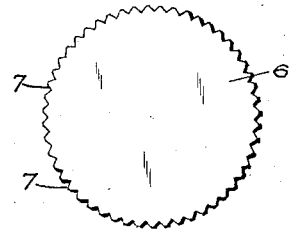
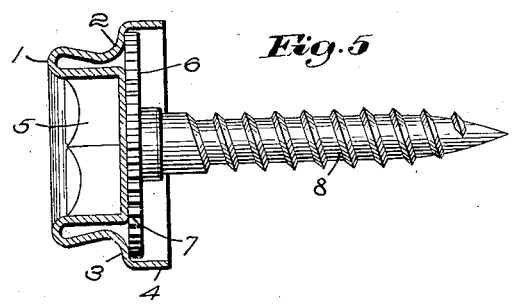
Inventor:
Walter H. Pierce,
by Emery Booth Janney + Varney
Attys Patented June 28, 1927.

1,634,234

UNITED STATES PATENT OFFICE.

WALTER H. PIERCE, OF CAMBRIDGE, MASSACHUSETTS, ASSIGNOR TO CARR FASTENER COMPANY, OF CAMBRIDGE, MASSACHUSETTS, A CORPORATION OF MAINE.

FASTENER STUD.

Application filed July 22, 1925. Serial No. 45,282.

This invention aims to provide an improved fastener stud.

In the drawings, which illustrate a preferred embodiment of my invention:—

Figure 1 is a front elevation of the stud;

Fig. 2 is a side elevation of the stud;

Fig. 3 is a section on the line 3—3 of Fig. 1, being partly in elevation.

Fig. 4 is a front elevation of the attaching part, showing the milled edge of the flange somewhat exaggerated; and Fig. 5 is a section on the line 5—5 of Fig. 1, being partly in elevation, and showing the cap member before the flange is crimped beneath the disk-like flange of the attaching part.

Referring to the drawings, I have shown the stud member of a separable fastener which includes a one-piece attaching part and a one-piece cap member both of which are circular in cross-section except a portion of the tool-receiving depression in the cap member.

The cap member presents a ringlike head 1, a neck 2, a base 3 and a flange portion 4, as best illustrated in Fig. 5. The cap is also provided with a tool-receiving depression 5 extending inwardly from the head 1 and herein illustrated as rectangular in crosssection throughout a portion of its depth.

The attaching part includes a flat disklike flange portion 6 of relatively large diameter having a toothlike or milled periphery 7 (Fig. 4) and a screw-threaded shank portion 8 extending from the flange portion.

The cap member is secured to the attaching member by crimping the flange portion 4 against the milled periphery 7 and beneath the flange portion 6 so that the base 3 overlies the disklike portion 6 at one side and the flange 4 overlies the other side, as shown in Fig. 3. The toothlike projections bite into the flange 4 and prevent relative turning between the cap and the attaching part when the stud is being screwed into or out of engagement with a support.

When the stud is completely assembled, the bottom of the tool-receiving depression 5 seats against and back-supports the flange portion 6 of the attaching part directly above the shank portion 8. This is particularly necessary where the shank portion is a rivet or drive screw sometimes used in connection with the type of cap member illustrated.

A socket wrench may be inserted in the tool-receiving recess and rotated to attach or detach the stud from a support. Rotation of the cap member produces like rotation of the attaching part because of the interlocking engagement of the milled periphery 7 of the disklike portion 6 with the flange 4 of the cap. This interlocking arrangement permits the use of parts which are circular in cross-section without any interlocking engagement between the depressed portion 5 and the flange 6, as heretofore used in other known studs for similar use. Thus the operation of assembling the cap and attaching part is somewhat simplified by eliminating the necessity for registering one part relative to the other.

While I have shown and described a preferred embodiment of my invention, it will be understood that changes involving omission, substitution, alteration and reversal of parts may be made without departing from the scope of my invention, which is best defined in the following claims.

Claims—

1. A stud for a separable fastener comprising a cap part providing the head and neck of the stud and attaching means for securing said cap part to a support, said attaching means having an enlarged flat disklike portion having a milled periphery, and said cap part having a flange portion clamped about the margin of said disk-like portion to secure the parts together, said milled periphery preventing relative turning between the parts.

2. A stud for a separable fastener comprising a cap part providing the head and neck of the stud, said cap part having a depression formed therein to provide toolreceiving means, and a cooperating attaching screw for securing said stud to a suitable support, said screw having a relatively thin head milled at its periphery and said cap part having a marginal flange clamped over said milled periphery to hold the cap part and screw in assembly.

3. A separable fastener element comprising a sheet metal portion provided with means for cooperative engagement with a cooperating fastener element, and an attaching element secured in non-rotatable relation to said sheet metal portion for securing it to a suitable support, said attaching element having a relatively large thin head milled at its periphery, and said sheet metal portion having a flange pressed into engagement with said milled periphery and crimped over the margin of said head.

In testimony whereof, I have signed my name to this specification.

WALTER H. PIERCE.